(12) United States Patent
Horii

(10) Patent No.: US 8,857,997 B2
(45) Date of Patent: Oct. 14, 2014

(54) PORTABLE ELECTRONIC DEVICE WITH A PROJECTOR

(75) Inventor: Seiji Horii, Yokohama (JP)

(73) Assignee: Kyocera Corporation, Kyoto (JP)

( * ) Notice: Subject to any disclaimer, the term of this patent is extended or adjusted under 35 U.S.C. 154(b) by 304 days.

(21) Appl. No.: 12/914,763

(22) Filed: Oct. 28, 2010

(65) Prior Publication Data

US 2011/0096303 A1    Apr. 28, 2011

(30) Foreign Application Priority Data

Oct. 28, 2009 (JP) ................. 2009-248216

(51) Int. Cl.
*G03B 21/16* (2006.01)
*H04M 1/02* (2006.01)

(52) U.S. Cl.
CPC ............. *H04M 1/0237* (2013.01); *G03B 21/16* (2013.01); *H04M 1/0272* (2013.01); *H04M 1/0233* (2013.01)
USPC ........................................... 353/57; 353/119

(58) Field of Classification Search
USPC ....................... 353/52, 57, 87, 119
See application file for complete search history.

(56) References Cited

U.S. PATENT DOCUMENTS

| 8,016,430 | B2 | 9/2011 | Heo et al. | |
|---|---|---|---|---|
| 2007/0135181 | A1 | 6/2007 | Ohki et al. | |
| 2009/0033880 | A1* | 2/2009 | Heo et al. | 353/52 |
| 2009/0036158 | A1* | 2/2009 | Fujinawa et al. | 455/556.1 |
| 2009/0135258 | A1 | 5/2009 | Nozaki | |
| 2009/0231787 | A1* | 9/2009 | Moriguchi et al. | 361/679.01 |

FOREIGN PATENT DOCUMENTS

| EP | 1 887 761 A2 | 2/2008 |
|---|---|---|
| EP | 2 026 126 A1 | 2/2009 |
| JP | 2006-217014 A | 8/2006 |
| JP | 2007096542 | 4/2007 |
| KR | 2002-0050445 A | 6/2002 |
| KR | 2009-0013363 A | 2/2009 |

OTHER PUBLICATIONS

Office Action dated Jul. 31, 2012, issued in counterpart Korean Application No. 10-2010-0104519.

(Continued)

*Primary Examiner* — Thanh Luu
*Assistant Examiner* — Renee D Chavez
(74) *Attorney, Agent, or Firm* — Procopio, Cory, Hargreaves & Savitch LLP

(57) ABSTRACT

An object of the present invention is to provide a portable electronic device which the user can comfortably use by suppressing temperature rise in the surface of the device caused by heat from a heat source. The object is achieved by a portable electronic device including: a first casing; a second casing disposed opposed to one of surfaces of the first casing and capable of changing a position relative to the first casing while maintaining a state where opposed surfaces are opposed; and a heat source disposed in the second casing. Surface of the second casing includes: a first region which is covered with the first casing in a first state where the first and the second casings are opposed and is exposed to the outside in a second state where the position relative to the first casing is changed and area of the opposed surfaces of the first and the second casings decreases from the first state; and a second region which is always exposed to the outside in both of the first and the second states. At least a part of the heat source is disposed in a position corresponding to the first region.

18 Claims, 7 Drawing Sheets

(56) References Cited

OTHER PUBLICATIONS

Office Action dated Dec. 9, 2011, issued in counterpart Korean Application No. 10-2010-0104519.

Extended European Search Report dated Feb. 21, 2011 issued for counterpart European Application No. 10189149.7.
Last Non-Final Office Action dated Feb. 27, 2013, issued in counterpart Korean Application No. 10-2010-0104519.

* cited by examiner

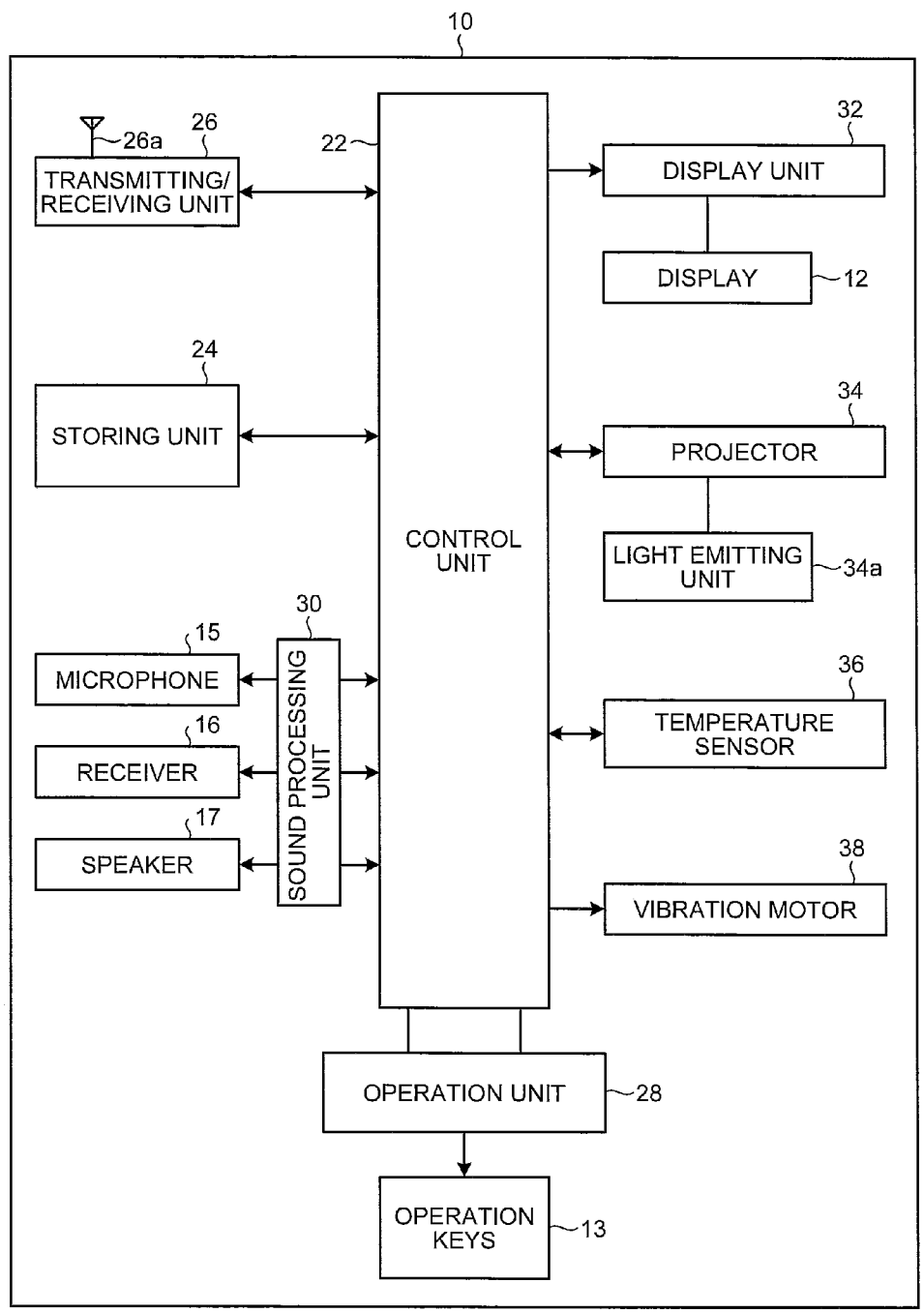

PORTABLE ELECTRONIC DEVICE WITH A PROJECTOR

BACKGROUND OF THE INVENTION

1. Field of the Invention

The present application claims priority under 35 U.S.C. §119 to Japanese Patent Application No. 2009-248216, filed on Oct. 28, 2010, entitled "PORTABLE ELECTRONIC DEVICE". The content of which is incorporated by reference herein in its entirety.

2. Description of the Related Art

Hitherto, as an apparatus for projecting an image onto a wall surface or a screen, there is a so-called projector. A mainstream projector is an apparatus of a so-called standing type to which power is supplied from a commercial power source and which is used in a state where it is fixed in a predetermined position. The projector of the standing type, in a fixed state, projects an image onto a wall surface or a screen in a fixed place.

On the other hand, in recent years, a portable projector which is small and easy to carry is proposed as the projector. For example, Japanese Patent Application Publication Laid-open No. 2007-96542 (patent document 1) discloses a portable terminal with a projector function, having an upper cabinet, a lower cabinet, and a hinge connecting the upper and lower cabinets so as to be swingable, and in which a projector having a lens and a light source is mounted.

The conventional projector of the standing type uses a light source of high luminance for projecting an image onto a large screen and, since an amount of heat generation from the light source is also large, is provided with a fan and a vent for improving heat dissipation efficiency. However, since a portable terminal with a projector function in recent years is constructed compactly, if a mechanism for dissipating heat generated by a light source of a projector is added, it is considered that the portable terminal becomes large.

In the conventional portable terminal with the projector function, in the case of continuously using the projector, temperature rise near the light source has to be considered. In particular, in the case of a portable electronic device such as a cellular phone, since the skin of the user directly touches the surface of the terminal at the time of speech communication or operation, the user easily feels the temperature difference that the projector mounting position is warmer than the other part. There is consequently the possibility that the user of the cellular phone feels unpleasant.

For example, in the patent document 1, as an example of the portable terminal with the projector function, examples of a folding type, a slider type, and a straight (candy bar) type are illustrated. In portable terminals of all of the types, a light emitting unit of a projector is provided at the front end near the receiver, but a mechanism for cooling it is not provided. Consequently, after use of the projector, the portion around the receiver becomes warm. When the user makes a telephone call by using the portable terminal, the user feels warm by his/her ear and may feel unpleasant during use.

Considering a situation that the user carries the portable terminal of the patent document 1 after use of the projector, the portable terminals of all of the types have a structure that heat generated by the projector warms the surface of the portable terminal in a portable mode. Consequently, a temperature difference occurs between a part heated (for example, a part around the receiver) and the other part. Due to this, there is the possibility that the user feels unpleasant when he/she carries the portable terminal by hand or touches the portable terminal in order to make a telephone call with the portable terminal.

SUMMARY OF THE INVENTION

According to an aspect of the present invention, a portable electronic device includes: a first casing; a second casing disposed opposed to one of surfaces of the first casing and capable of changing a position relative to the first casing while maintaining a state where opposed surfaces are opposed; and a heat source disposed in the second casing, wherein surface of the second casing includes: a first region which is covered with the first casing in a first state where the first and the second casings are opposed and is exposed to the outside in a second state where the position relative to the first casing is changed and area of the opposed surfaces of the first and the second casings decreases from the first state; and a second region which is always exposed to the outside in both of the first and the second states, and at least a part of the heat source is disposed in a position corresponding to the first region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a block diagram of a schematic configuration of the portable electronic device according to the first embodiment of the present invention;

DETAILED DESCRIPTION OF THE PREFERRED EMBODIMENTS

The present invention will be described in detail below with reference to the drawings. However, the present invention is not limited to the following embodiments. Constituent elements in the embodiments include those that can be easily assumed by those skilled in the art or that are substantially equivalent. In the following, a cellular phone will be taken as an example of the portable electronic device. The object to which the present invention is applied is not limited to a cellular phone. For example, the present invention can be applied to a Personal Handyphone System (PHS), a Personal Digital Assistant (PDA), a portable navigation system, a notebook-sized personal computer, a game device, and the like.

Figure 1:
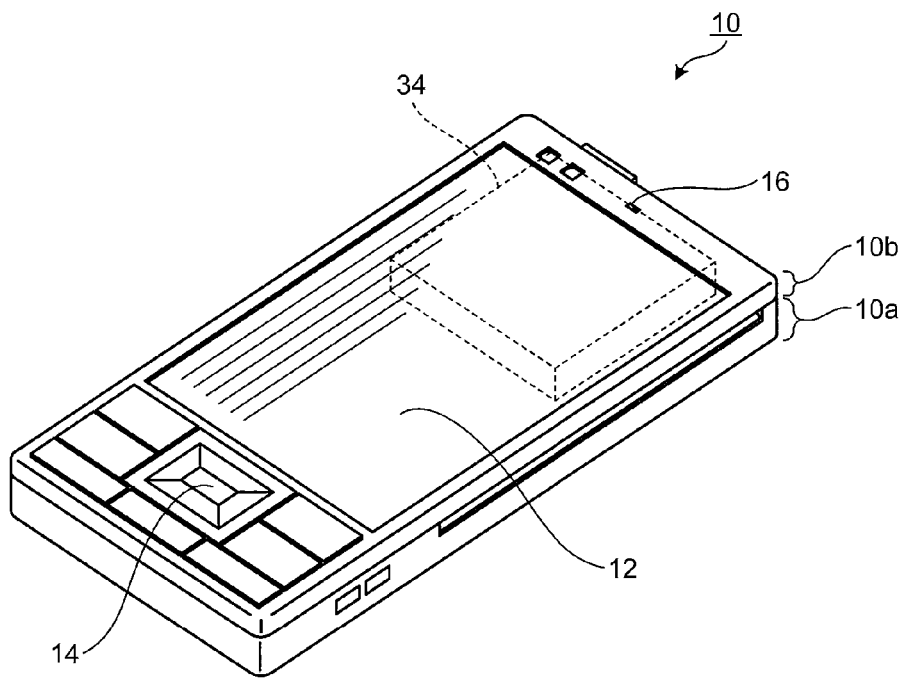
FIG. 1 is a perspective view of a first state of a portable electronic device according to a first embodiment of the present invention.
Figure 2:
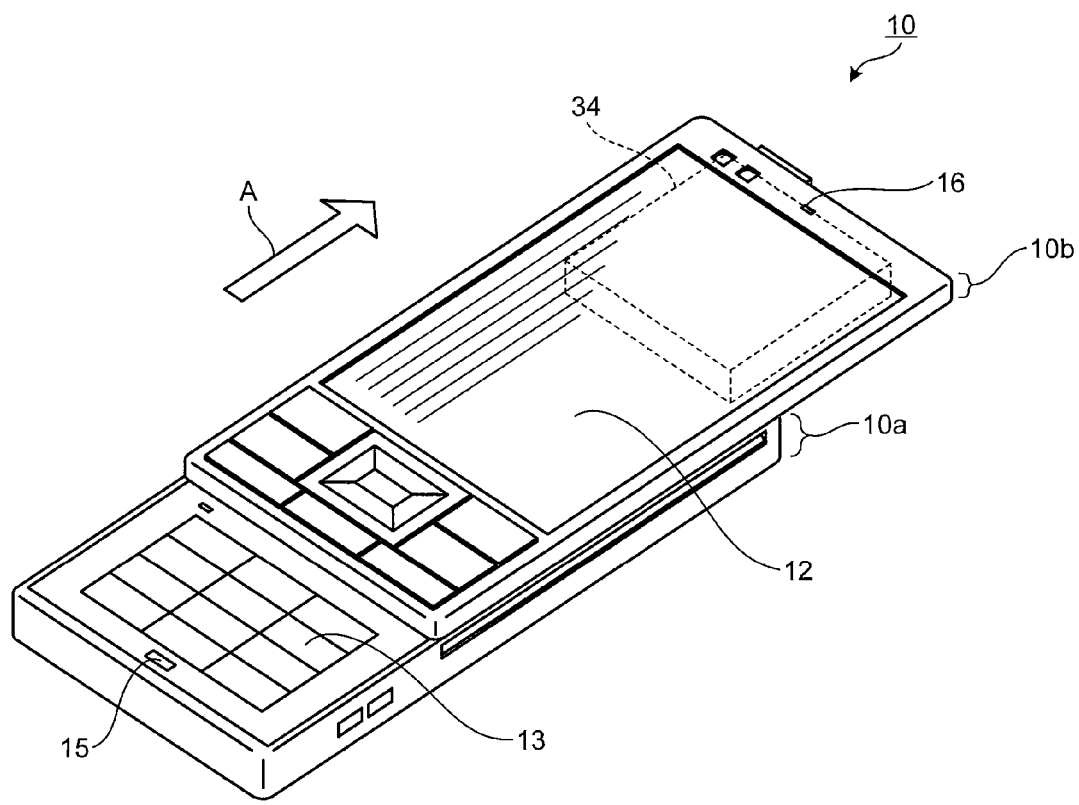
FIG. 2 is a perspective view of a second state of the portable electronic device illustrated in FIG. 1.
Figure 3:
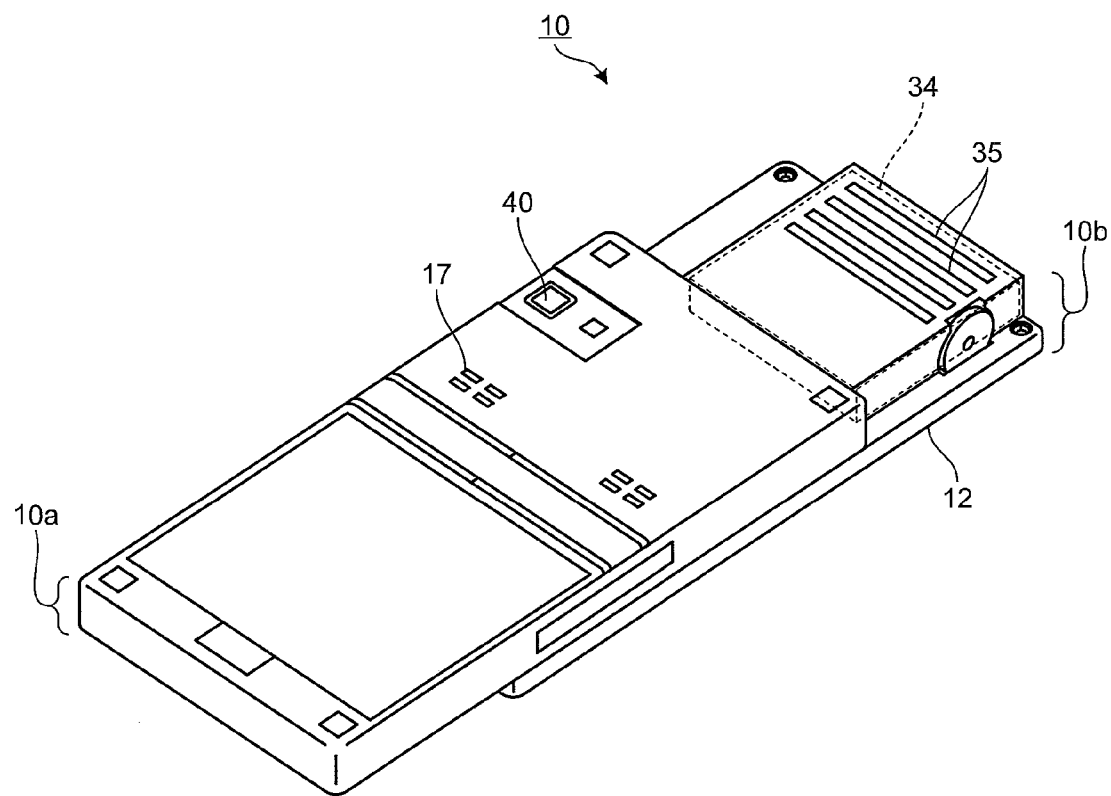
FIG. 3 is a perspective view of the portable electronic device in FIG. 2 as seen from the rear face side.

First, the configuration of the appearance of a portable electronic device will be described. FIG. 1 is a perspective view of a first state of a portable electronic device according to a first embodiment of the present invention. FIG. 2 is a perspective view of a second state of the portable electronic device illustrated in FIG. 1. FIG. 3 is a perspective view of the portable electronic device in FIG. 2 as seen from the rear face side.

A portable electronic device 10 is a cellular phone having a wireless communication function and has, as illustrated in FIGS. 1 and 2, first and second casings 10a and 10b each having an almost rectangular parallelepiped shape. Largest surfaces of the first and the second casings 10a and 10b are disposed so as to oppose each other. The sizes of the opposed surfaces of the first and the second casings 10a and 10b are almost the same. The portable electronic device 10 is a slider-type cellular phone obtained by assembling the first casing 10a slidably along the second casing 10b in the longitudinal direction of the opposed surfaces of the first and the second casings 10a and 10b. FIG. 1 illustrates the portable electronic device 10 in a first state which is a state where the first and the second casings 10a and 10b face each other, concretely, an overlapped region of the opposed surfaces (facing surfaces) of the first and the second casings 10a and 10b is the largest (that is, completely overlapped). FIG. 2 illustrates the portable electronic device 10 in a second state in which relative positions of the second casing 10b to the first casing 10a are changed from the first state to the direction of blank arrow A and the overlapped area of opposed surfaces (facing surfaces) of the first and the second casings 10a and 10b is smaller than that in the first state.

In the present embodiment, the region in the surface of the second casing 10b, which is covered with the first casing 10a in the first state and is exposed to the outside in the second state, that is, the region which is covered with (faces) the first casing 10a in the first state and which is not covered with (does not face) the first casing 10a in the second state will be called a first region in the second casing 10b. The region in the surface of the second casing 10b, which is always exposed to the outside in both the first and the second states, that is, the region which is not covered with the first casing 10a in both of the first and the second states will be called a second region in the second casing 10b. A region in the surface of the first casing 10a, which is not exposed in the first state but is exposed to the outside in the second state will be called a third region in the first casing 10a. In the first embodiment, as illustrated in FIG. 2, operation keys 13 and a microphone 15 which will be described later are disposed in the third region.

The first casing 10a has, in addition to the operation keys 13 and the microphone 15 for taking sound at the time of speech communication of the portable electronic device 10 as illustrated in FIG. 2, a portable telephone circuit board which plays main functions of a cellular phone and will be described later, a speaker 17, a camera module 40, a main antenna and the like.

The second casing 10b has a display 12 illustrated in FIGS. 1 and 2 as a display unit, and the face of the display 12 is included in the second region. On the display 12, as a predetermined image, a standby image is displayed in a state where the portable electronic device 10 waits for reception or a menu image used for supporting an operation on the portable electronic device 10 is displayed. Below the display 12, a direction and determination key 14 is disposed. Above the display 12, a receiver 16 that generates sound at the time of speech communication of the portable electronic device 10 is provided. On the inside of the second casing 10b, concretely, in a position corresponding to the first region, a projector 34 is disposed.

FIG. 3 is a perspective view of the portable electronic device 10 of FIG. 2 seen from the rear face side, that is, seen from the side opposite to the face on which the display 12 and the operation keys 13 are provided. The configuration provided on the rear face side of the portable electronic device 10 will be described below with reference to FIG. 3. First, as illustrated in FIG. 3, the projector 34 is disposed in a position corresponding to the first region in the second casing 10b. By disposing the projector 34 in the position corresponding to the first region in the second casing 10b, heat generated from the projector 34 as a heat source is conducted more to the first region than to the second region. That is, in the position corresponding to the first region, in the second casing 10b, generated heat is conducted to the first region more than to the second region.

As illustrated in FIG. 3, slits 35 are formed in the first region in the second casing 10b. The slits 35 are vent holes connecting the inside of the second casing 10b to the outside of the casing and are openings for releasing air in the casing overheated by the heat generated from the heat source such as the light source of the projector 34 to the outside of the casing. Although the slits are provided as openings in the embodiment, as long as air can be released, any shape may be employed. For example, a number of holes or mesh-shaped openings may be provided.

As illustrated in FIG. 3, on the rear face side of the first casing 10a, that is, on the side opposite to the face on which the operation keys 13 are disposed, the speaker 17 and the camera module 40 are disposed.

Figure 4A:
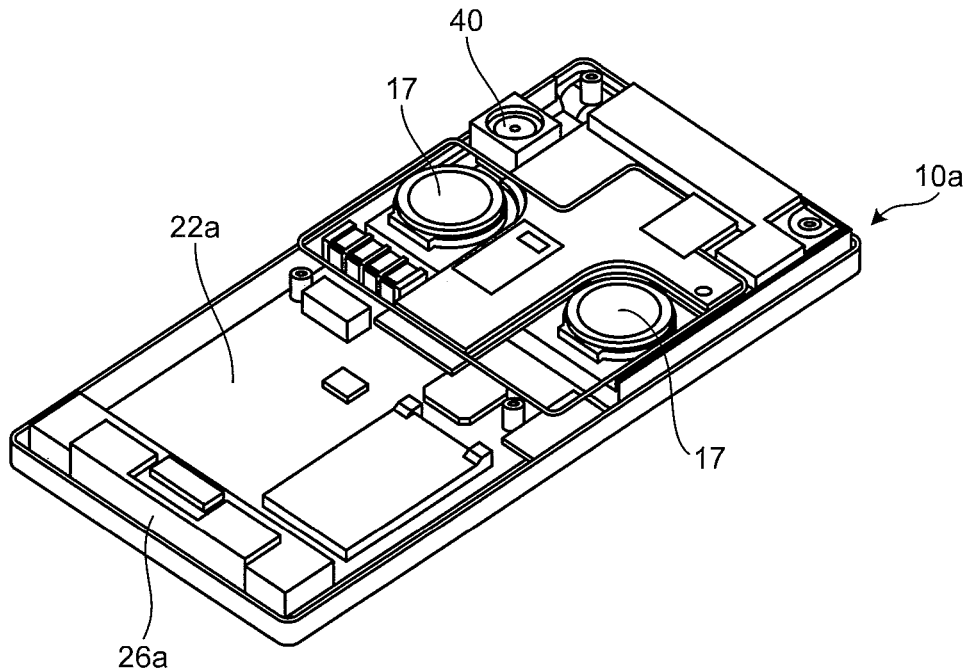
FIG. 4A is a perspective view of an internal structure of a first casing of the portable electronic device illustrated in FIG. 3.
Figure 4B:
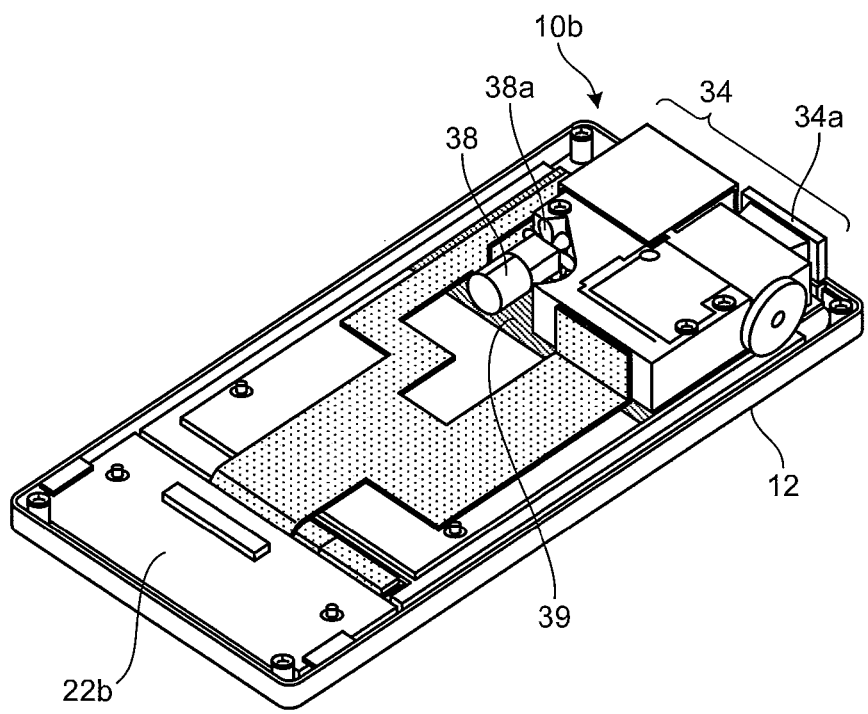
FIG. 4B is a perspective view of an internal structure of a second casing of the portable electronic device illustrated in FIG. 3.

FIG. 4A is a perspective view of an internal structure example of the first casing 10a of the portable electronic device 10 in FIG. 3. FIG. 4B is a perspective view of an internal structure example of the second casing 10b. With reference to FIGS. 4A and 4B, the layout in each of the above-described configurations of the portable electronic device 10 will be described below. As illustrated in FIG. 4A, in the first casing 10a, the speaker 17, a cellular phone circuit board 22a, a main antenna 26a, a camera module 40, and the like are disposed. As described above, the image-taking lens that captures an image of the camera module 40 is exposed from the first casing 10a to the outside.

As illustrated in FIG. 4B, in the second casing 10b, the projector 34 and a projector control board 22b are disposed on the side of the rear face (the face opposite to the face for displaying an image) of the display 12. The projector 34 has a light emitting unit 34a. The light emitting unit 34a is exposed to the outside, that is, disposed in an opening formed in the second casing 10b. The projector 34 projects an image by emitting light from the light emitting unit 34a.

Further, the portable electronic device 10 has, in the second casing 10b, a vibration motor 38 and a fan 38a coupled to the rotary shaft of the vibration motor 38. The vibration motor 38 is an eccentric motor whose rotary shaft is provided with an eccentric weight, generates vibrations by making the rotary shaft provided with the eccentric weight rotate, and makes the second casing 10b vibrate. The vibration motor 38 is used at the time of notifying of an incoming call and can notify the user of an incoming call by vibrating the second casing 10b without outputting sound.

The fan 38a is coupled to the rotary shaft of the vibration motor 38 and rotates when the vibration motor 38 runs. When the fan 38a rotates by the rotation of the vibration motor 38, the flow of air is generated in the second casing 10b. By the generation of the flow of air by the fan 38a, the air in the second casing 10b and the outside air circulate via the slits 35. By the circulation, the warmed air around the projector 34 can be discharged to the outside, and the projector 34 and its periphery can be cooled down. In a manner similar to the first embodiment, by disposing the fan 38a adjacent to the projector 34 to send the air blown from the fan 38a to the projector 34 or discharging the air around the projector 34 by the fan 38a to the outside, the projector 34 can be cooled efficiently. According to the first embodiment, only by adding the fan 38a to the tip of the existing vibration motor 38, the function of cooling the projector 34 can be added. Consequently, the number of parts and mounting space which increases due to the addition of the cooling function can be reduced, and the device can be miniaturized.

As illustrated in FIG. 4B, a heat insulation sheet 39 is interposed between the surface (second region) of the display 12 and the projector 34. By disposing the heat insulation sheet 39, conduction of heat generated from the heat source such as the light source of the projector 34 to the surface on the side of the display 12 can be suppressed. As the heat insulation sheet, for example, a heat insulating material in a thin sheet shape made of mainly microballoon (closed pores) for an electronic device can be suitably used.

By disposing the projector 34 on the side of the second casing 10b provided with the display 12, even when the second casing 10b is set in the second state at the time of projecting an image, a projected image can be prevented from being blocked. By dispersing the heat generation sources, rise in temperature only in a part of the first casing 10a and/or the second casing 10b, particularly, only in a part of the surface can be suppressed. For example, the projector 34 is provided on the side of the second casing 10b on which parts that do not generate heat so much like the display 12 of an LCD are mounted. The cellular phone circuit board 22a, a battery (not illustrated), and the like which do not generate heat as much as the projector 34 but can be heat generation sources are provided on the side of the first casing 10a. By providing the camera module 40 on the side of the first casing 10a, the camera module 40 can be disposed far from the heat generation of the projector 34, and the number of connections between the circuit on the side of the display 12 and the circuit on the side of the operation keys 13 can be made small.

FIG. 5 is a block diagram of a schematic configuration of the portable electronic device according to the first embodiment of the present invention. With reference to FIG. 5, the functional configuration of the portable electronic device 10 will be described below. As illustrated in FIG. 5, the portable electronic device 10 has a control unit 22, a storing unit 24, a transmitting and receiving unit 26, an operation unit 28, a sound processing unit 30, a display unit 32, the projector 34, a temperature sensor 36, the vibration motor 38, and the like.

The control unit 22 is a processing unit such as a central processing unit (CPU), a micro processor unit (MPU), or the like for controlling general operation of the portable electronic device 10 in a centralized manner. Specifically, the control unit 22 controls the operation of the transmitting and receiving unit 26, the sound processing unit 30, the display unit 32, and the like so that various processes of the portable electronic device 10 are executed in proper procedure in accordance with operation of the operation unit 28 and software stored in the storing unit 24 of the portable electronic device 10. The various processes of the portable electronic device 10 include, for example, verbal communication performed via a line switching network, creation and transmission/reception of an electronic mail, browsing of a Web (World Wide Web) site on the Internet, and the like. Operations of the transmitting and receiving unit 26, the sound processing unit 30, the display unit 32, and the like include, for example, transmission/reception of signals by the transmitting and receiving unit 26, input/output of voice by the sound processing unit 30, and display of an image by the display unit 32.

Concretely, the control unit 22 executes processes on the basis of programs (for example, an operating system program, an application program, and the like) stored in the storing unit 24. The control unit 22 sequentially reads instruction codes from the operating system program, the application program, or the like stored in the storing unit 24 and executes processes on the basis of instruction codes. Examples of the application program executed by the control unit 22 include an application program for driving the projector and controlling the rotation of a cooling fan using the vibration motor 38 which will be described later, an image reproduction application program for reproducing a still picture and a motion picture, and a game application program for operating various games.

In the storing unit 24, software and data used for the processes in the control unit 22, for example, the application program that controls the driving of the projector 34, the image reproduction application program that reproduces a still picture and a motion picture, and the application program for operating various games are stored.

In the storing unit 24, in addition to the above application programs, for example, voice data received by communication or downloaded, software used by the control unit 22 for control on the storing unit 24, an address book that stores and manages telephone numbers, mail addresses, and the like of other parties of communication, a sound file of dial tone, ringtone, and the like, temporary data used in processes of software, and the like are also stored. Computer programs and temporary data used in processes of software are temporarily stored in a work area allocated in the storing unit 24 by the control unit 22. The storing unit 24 is constructed by, for example, nonvolatile storing devices (a nonvolatile semiconductor memory such as a Read Only Memory (ROM), a hard disk drive, and the like), readable/writable storage devices (such as an Static Random Access Memory (SRAM) and Dynamic Random Access Memory (DRAM)), and the like.

The transmitting and receiving unit 26 has the main antenna 26a, establishes a wireless signal line of the CDMA method or the like between itself and a base station via a channel assigned by the base station, and performs telephone communication and information communication with the base station.

The operation unit 28 is constructed by, for example, the operation keys 13 to which various functions are assigned such as a power key, a telephone call key, numeric keys, character keys, direction keys, a determination key, and a transmission key, and the direction and determination key 14. When the keys are operated by the user, a signal corresponding to the operation is generated. The generated signal is supplied as an instruction of the user to the control unit 22.

The sound processing unit 30 executes processes on a sound signal input from the microphone 15 and a sound signal output to the receiver 16. Specifically, the sound processing unit 30 amplifies sound input from the microphone 15, performs A/D conversion (Analog-to-Digital conversion) on the sound, also performs a signal process such as encoding, and outputs the resultant digital sound data to the control unit 22. The sound processing unit 30 performs processes such as decoding, D/A conversion (Digital-to-Analog conversion), and amplification on the sound data supplied from the control unit 22 and outputs the resultant analog sound signal to the receiver 16.

The display unit 32 has a display panel (the above-described display 12 or the like) such as a liquid crystal display (LCD) or an organic electro-luminescence panel and displays a video image according to video data supplied from the control unit 22 and an image according to image data on the display panel. The display unit 32 may have, in addition to the display 12, for example, a sub-display in a position which is exposed to the outside also in a state where the casing is closed.

The projector 34 is an image projecting unit for projecting an image and, as described above, is disposed in a position corresponding to the first region in the second casing 10b. The portable electronic device 10 projects an image, that is, emits light which forms an image from the light emitting unit 34a of the projector 34, thereby projecting an image onto a predetermined region (projection region) in a wall (not illustrated) surface, screen, or the like on the opposed face in the sliding direction (refer to the direction A in FIG. 2) of the second casing 10b. The operation of the projector 34 is controlled by the control unit 22 so that various video images such as a movie or presentation data sent from the control unit 22 can be projected and displayed in the projection region.

The projector 34 includes a light source and an optical system for switching whether light emitted from the light source is projected or not. As the projector 34, for example, a projector using a halogen light, an Light Emitting Diode (LED) light source, or an Laser Diode (LD) light source as the light source and using an Liquid Crystal Display (LCD) or a Digital Micro-mirror Device (DMD) as the optical system can be employed. In this case, by disposing the optical systems in such a way that the optical systems covers the entire projection region and turning on/off the pixels of the optical systems in accordance with an image, the image can be projected to the entire projection region. As the projector 34, a projector having a laser as a light source and an optical system including a switching device that switches whether light emitted from the light source is passed or not and a mirror for performing a raster-scan with the light passed through the switching device can also be employed. In this case, by scanning the entire projection region with light emitted from the light source while changing the angle of the light emitted from the laser by the mirror, an image can be projected to the projection region.

The temperature sensor 36 is a detecting unit disposed in the projector 34 and detects the internal temperature. The vibration motor 38 is, as described above, an eccentric motor in which the fan 38a is connected to the tip of the rotary shaft. The vibration motor 38 makes the fan 38a attached to the tip of the rotary shaft rotate to circulate the air in the second casing 10b, thereby cooling the projector 34. When the temperature detected by the temperature sensor 36 becomes equal to or higher than predetermined temperature, the control unit 22 runs the vibration motor 38 to rotate the fan 38a. Basically, the portable electronic device 10 in the first embodiment is constructed as described above.

Figure 6:
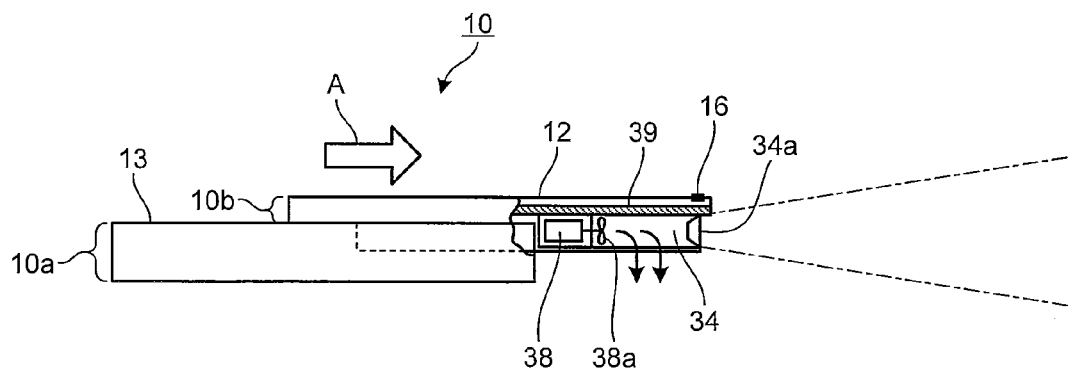
FIG. 6 is a partially cutaway cross sectional view of the portable electronic device in FIG. 2 as seen from a side thereof.
Figure 7:
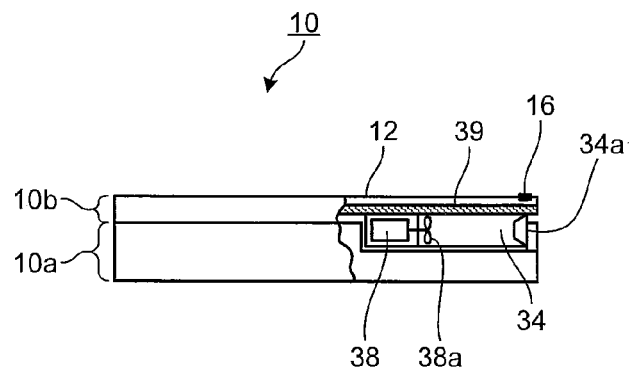
FIG. 7 is a partially cutaway cross sectional view of the portable electronic device in FIG. 1 as seen from a side thereof.

Referring now to FIGS. 6 and 7, the image displaying/projecting operation of the portable electronic device 10 in the first embodiment, concretely, a state during image projection by the projector 34 and a state after the image projection will be described. FIG. 6 is a partially cutaway cross sectional view of the portable electronic device in FIG. 2 as seen from a side thereof. FIG. 7 is a partially cutaway cross sectional view of the portable electronic device in FIG. 1 as seen from a side thereof.

In the portable electronic device 10 according to the first embodiment, in the case of projecting an image by using the projector 34, as illustrated in FIG. 6, the second casing 10b is made slide in the direction of the hollow arrow A along the first casing 10a to expose the first region corresponding to the position where the projector 34 is disposed to the outside. In this state, the control unit 22 of the portable electronic device 10 makes light emitted from the light emitting unit 34a of the projector 34 to project an image onto a wall face or a screen. As described above, at the time of projection, by setting the portable electronic device 10 in the second state, the first region to which heat generated from the light source of the projector 34 and the like is conducted can be set to a state where it does not face the first casing 10a and is exposed to the outside air. Consequently, the heat generated by the projector 34 can be released to the outside of the casing (the second casing 10b) with high heat dissipation effect, and temperature rise in the casing can be suppressed. Preferably, the portable electronic device 10 has a posture sensor that detects the positional relation between the first and the second casings 10a and 10b, and the control unit 22 allows projection of an image only in the case that the second state is detected on the basis of a detection result of the sensor. With the configuration, projection of an image not in a proper posture can be suppressed.

Further, when the temperature sensor 36 in the projector 34 detects that the internal temperature becomes equal to or higher than the predetermined temperature, the control unit 22 of the portable electronic device 10 runs the vibration motor 38. By running the vibration motor 38, the fan 38a is rotated to send air, so that the air in the casing warmed by the heat generated by the projector 34 can be discharged from the slits 35. By the operation, the projector 34 can be forcedly cooled. Cooling by the vibration motor 38 and the fan 38a in such a manner, even in the case of continuously using the projector 34 for long time, temperature rise can be suppressed with reliability.

The portable electronic device 10 is of the slider type of making the second casing 10b slide in the longitudinal direction along the first casing 10a, and the projector 34 having the heat source is disposed in a position corresponding to the first region which is exposed to the outside when the second casing 10b slides. Consequently, also in the case of projecting an image in a state where the portable electronic device 10 is put on a stand, as illustrated in FIG. 6, the projector 34 is apart from the stand only by the thickness of the first casing 10a, and the first region to which heat of the projector 34 is mainly conducted is also apart from the stand. Therefore, the effect of heat dissipation by outside air can be expected and air can be circulated via the slits 35.

As described above, in the portable electronic device 10, the heat insulation sheet 39 is disposed between the display 12 in the second casing 10b and the projector 34, so that heat generated by the projector 34 can be prevented from being conducted to the surface on the side of the display 12. Consequently, in addition to the effect of the heat dissipation from the first region and the cooling effect by the fan 38a, conduction of heat generated by the projector 34 to the surface on the side of the display 12 of the second casing 10b can be suppressed by the heat insulation effect of the heat insulation sheet 39. As a result, heating of the second region in the second casing 10b can be suppressed. For example, even when the telephone rings during use of the projector and the user puts the receiver 16 on his/her ear, since the surface temperature difference is small, the user can talk over the telephone without feeling unpleasant.

Now, the case where the user performs image projection by the projector 34 in the second state in which the second casing 10b is made slide in the direction of the hollow arrow A and is displaced and, after completion of the projection, the user carries the portable electronic device 10 (by putting it into a pocket or a bag, or by hand) will be described. In the case where the user carries the portable electronic device after completion of the projection of the projector 34, basically, the relative positions of the first and the second casings 10a and 10b are returned to the first state as illustrated in FIG. 7. In this state, the projector 34 as the heat source is sandwiched between the first casing 10a and the display 12 of the second casing 10b. The first region is in a position opposed to the first casing 10a. Only by returning the second casing 10b to the first state after completion of the projection of the projector 34, the user can carry the portable electronic device 10 without directly touching the first region heated by the projector 34 with a hand. Since the first region heated most by the use of the projector 34 can be prevented from being exposed, occurrence of the surface temperature difference of the portable electronic device 10 is suppressed. Even when the portable electronic device 10 is carried by a hand, the possibility that the user feels unpleasant can be reduced.

In the portable electronic device 10 in the second state where the projector 34 is used, by heat dissipation to the outside air and forced cooling by the fan 38a, the temperature rise is suppressed in the second region in addition to the first region. Further, since the heat insulation sheet 39 is disposed between the projector 34 and the display 12, conduction of heat from the projector 34 to the surface on the side of the display 12 is suppressed. Even immediately after projection of the projector 34, temperature rise in the second region such as the side faces of the display 12 can be suppressed. As a result, the temperature difference between the second region in the second casing and the surface of the first casing can be reduced.

Figure 8:
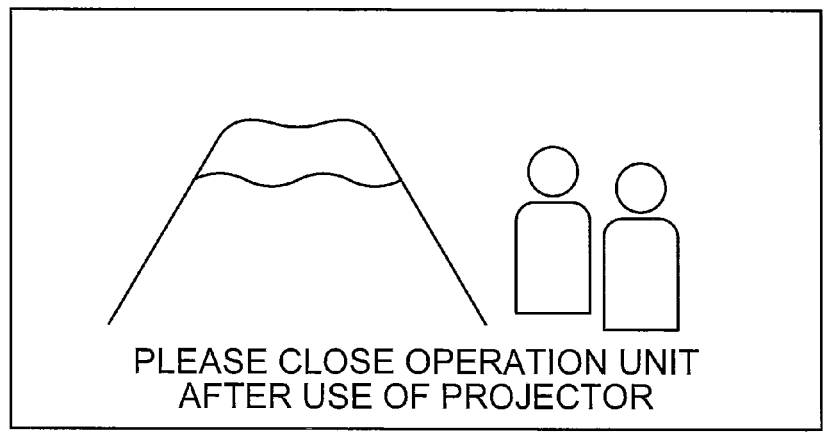
FIG. 8 is a diagram illustrating an example of a message displayed to the user at the end of use of the projector.

Preferably, at the end of use of the projector 34, the portable electronic device 10 projects, from the projector 34, a message urging the user to set the portable electronic device into the first state. FIG. 8 is a diagram illustrating an example of a message displayed to the user at the end of use of the projector. For example, preferably, at the end of projection of the projector 34, the control unit 22 includes notification information such as "Please close the operation unit after use of the projector" in a projected image as illustrated in FIG. 8. By projecting the message, the user is alerted to carry the portable electronic device 10 which is set in the first state. It can reduce the possibility such that the user forgets to set the portable electronic device 10 into the first state after projection of the projector 34, carries the device in the second state, touches the first region in the second casing 10b to which heat of the projector 34 is conducted, and feels unpleasant. Although the projected image including the notification information is projected, instead or in addition, the notification information may be displayed on the display 12 of the portable electronic device 10.

Preferably, the projector 34 is disposed with space from the substrate of the display 12 and the surface on the side of the display 12 of the second casing 10b. More preferably, the projector 34 is fixed to the face on the side of the first region of the second casing 10b. By disposing the projector 34 apart from the surface on the side of the display 12 of the second casing 10b, a structure that heat is not easily conducted to the surface on the side of the display 12 of the second casing 10b can be realized.

For a member used for the first region in the second casing 10b or the peripheral part (exterior) of the projector 34, by using a composite material of copper (Cu), aluminum (Al), and the like having excellent heat conductivity as the material of a radiator plate, the heat dissipation effect can be further enhanced. Further, by enlarging the surface area by attaching a patterned-indented fin to the surface of the radiator plate material, the heat dissipation effect can be further enhanced.

Preferably, for example, the control unit 22 intermittently controls the rotation of the vibration motor 38 at timings of switching a projection image and, during cooling operation by running the vibration motor 38, controls to interrupt the projecting operation. By the control, occurrence of blurring in an image projected can be suppressed.

Preferably, the vibration motor 38 has a configuration that a one-way clutch is interposed between the rotary shaft and the eccentric weight. With the configuration, at the time of rotation in one direction, for example, a forward direction, the vibration motor can generate vibrations by rotating the eccentric weight. At the time of rotation in another direction, for example, in a reverse direction, the vibration motor can rotate only the fan 38a at the tip of the rotary shaft without rotating the eccentric weight. As described above, by employing the configuration including the one-way clutch, only the fan can be rotated. Without generating vibrations, cooling operation can be performed.

Figure 9:
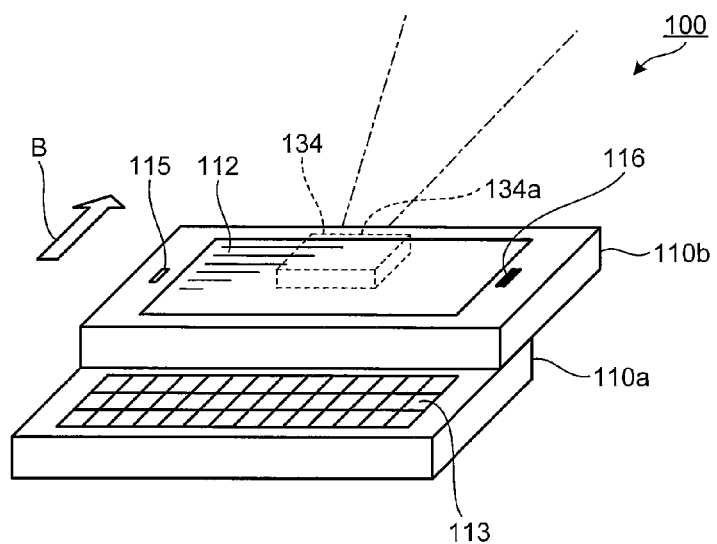
FIG. 9 is a perspective view of a portable electronic device according to a second embodiment of the present invention.

FIG. 9 is a perspective view of a portable electronic device according to a second embodiment of the present invention. In the first embodiment, as illustrated in FIG. 2, an image is projected from the projector 34 in the second state where the second casing 10b slides in the longitudinal direction of the first casing 10a of the portable electronic device 10. The present invention, however, is not limited to the portable electronic device of this type. For example, the second embodiment illustrated in FIG. 9 relates to the case where a projector 134 is mounted on a cellular phone of a type in which a second casing 110b slides in the short-side direction of a first casing 110a of a portable electronic device 100. In a second state illustrated in FIG. 9, an image may be projected from a light emitting unit 134a of the projector 134.

The configuration of the portable electronic device 100 is basically the same as that of the first embodiment but is different with respect to the point that the movement direction in which the relative position between the first and the second casings 110a and 110b changes is the short-side direction. The light emitting unit 134a of the projector 134 is provided near to the first region at the front end in the movement direction (the direction of hollow arrow B).

Since the portable electronic device 100 is similar to the portable electronic device 10 of the first embodiment except for the above-described configuration, the description will not be repeated.

Also in the type in which the second casing 110b slides in the short-side direction of the first casing 110a like in the portable electronic device 100, by providing the projector 134 in a position corresponding to the first region where the projector 134 is exposed in the second state and faces the first casing 110a in the first state, in a posture (first state) where the user carries the device, the first region to which heat is conducted most can be prevented from being touched by the user. Thus, the possibility that the user feels unpleasant can be reduced. At the time of projecting an image by the projector 134, heat generated from the projector 134 can be released from the first region exposed to the outside. Therefore, temperature rise in the casing can be suppressed.

Also in the portable electronic device 100, when the internal temperature detected by the temperature sensor 36 in the projector 134 becomes equal to or higher than predetermined temperature, by running the vibration motor 38 to rotate the fan 38a to discharge the air in the projector 134 from the slits 35, the control unit 22 can forcedly cool the projector 134. With the technique, the temperature rise in the casing can also be suppressed.

Also in the portable electronic device 100, by disposing a heat insulation sheet (not illustrated) between a display 112 of the second casing 110b and the projector 134, conduction of heat generated by the projector 134 to the surface on the side of the display 112 can be suppressed.

Figure 10:
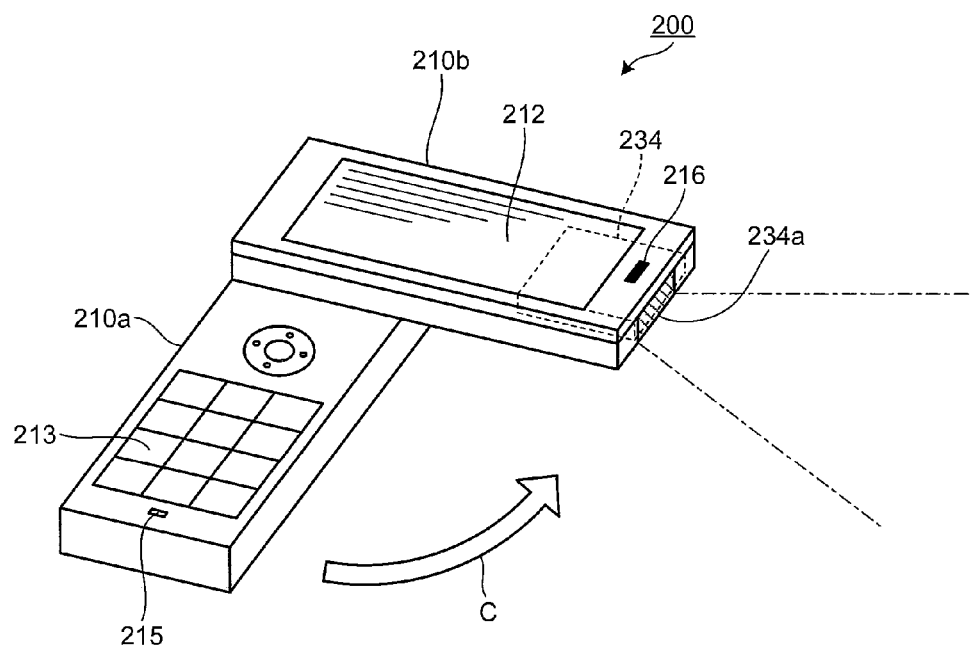
FIG. 10 is a perspective view of a portable electronic device according to a third embodiment of the present invention.

FIG. 10 is a perspective view of a portable electronic device according to a third embodiment of the present invention. In the third embodiment illustrated in FIG. 10, a first casing 210a and a second casing 210b of a portable electronic device 200 are supported swingably around a pivot point provided around a receiver 216 as a center. In FIG. 10, in a second state where the second casing 210b is turned by 90 degrees in the direction of hollow arrow C, an image is projected from a light emitting unit 234a of a projector 234 disposed in the first region exposed to the outside. Although not illustrated, in a second state where the second casing 210b is turned by 180 degrees in the direction of the hollow arrow C, a telephone call or image projection may be made.

The configuration of the portable electronic device 200 is basically the same as that of the first and the second embodiments but is different with respect to the point that, as illustrated in FIG. 10, from a first state where the surfaces of the largest area of the first and the second casings 210a and 210b face each other, the relative position is changed by turning the second casing 210b in the direction of the hollow arrow C, thereby setting the device in a second state. Accordingly, the projector 234 is disposed in the first region of the second casing 210b exposed to the outside, and the light emitting unit 234a is provided near to the first region at the end.

Since the portable electronic device 200 is similar to the portable electronic device 10 described in the first embodiment except for the above-described configuration, the description will not be repeated.

Also in the type in which the second casing 210b is turned relative to the first casing 210a to be in the second state like in the portable electronic device 200, by providing the projector 234 in a position corresponding to the first region where the projector 234 is exposed in the second state and faces the first casing 210a in the first state, in a posture (first state) where the user carries the device, the first region to which heat is conducted most can be prevented from being touched by the user. Thus, the possibility that the user feels unpleasant can be reduced. At the time of projecting an image by the projector 234, heat generated from the projector 234 can be released from the first region exposed to the outside. Therefore, temperature rise in the casing can be suppressed.

Also in the portable electronic device 200, when the internal temperature detected by the temperature sensor 36 in the projector 234 becomes equal to or higher than predetermined temperature, by running the vibration motor 38 to rotate the fan 38a to discharge the air in the projector 234 from the slits 35, the control unit 22 can forcedly cool the projector 234.

Also in the portable electronic device 200, by disposing a heat insulation sheet (not illustrated) between a display 212 of the second casing 210b and the projector 234, conduction of heat generated by the projector 234 to the surface on the side of the display 212 can be suppressed.

What is claimed is:

1. A portable electronic device comprising:
a first casing;
a second casing disposed opposed to one of the surfaces of the first casing and capable of changing a position relative to the first casing while maintaining a state where opposed surfaces are opposed;
a heat source and a heat insulation sheet disposed in the second casing; and
a display arranged on the second casing, wherein the heat insulation sheet is interposed between a surface of the display and the heat source;
wherein the surfaces of the second casing include
a first region which overlaps with the first casing in a first state where the first and the second casings are opposed and is exposed to the outside in a second state where the position relative to the first casing is changed and an overlapping area of the opposed surfaces of the first and the second casings decreases from the first state, and
a second region which is always exposed to the outside in both of the first and the second states,
at least a part of the heat source is disposed in a position corresponding to the first region, and
the second casing includes a fan, an eccentric weight and a vibration motor having a rotary shaft and a one-way clutch interposed between the rotary shaft and the eccentric weight such that, at the time of rotation in one direction, the vibration motor generates vibrations by rotating the eccentric weight, and at the time of rotation in another direction, the vibration motor rotates only the fan.

2. The portable electronic device according to claim 1, wherein the second casing is configured such that heat generated by the heat source is conducted more to the first region than to the second region.

3. The portable electronic device according to claim 1, wherein the heat source is a projecting unit is configured to project an image.

4. The portable electronic device according to claim 3, wherein the projecting unit is configured not to project an image when the first and the second casings are in the first state.

5. The portable electronic device according to claim 3, wherein the projecting unit is configured to project an image when the first and the second casings are in the second state.

6. The portable electronic device according to claim 3, wherein an opening for heat dissipation is provided in the first region.

7. The portable electronic device according to claim 6, further comprising a fan that sends air toward the opening.

8. The portable electronic device according to claim 3, wherein in a state that the first casing is put on a flat stand and the first and the second casings are in the second state, the first region is apart from surface of the stand.

9. The portable electronic device according to claim 3, wherein the projecting unit is configured to project an image including notification information that encourages the user to carry the portable electronic device in the first state.

10. The portable electronic device according to claim 3, wherein at least a part of an operating unit is disposed in a third region which is exposed when the first casing is in the second state.

11. The portable electronic device according to claim 3, wherein the relative position is changed from the first state to the second state by moving the second casing in a longitudinal direction of the first casing, and a light emitting unit of the projecting unit is provided adjacent to the first region at a front end in a movement direction of the second casing.

12. The portable electronic device according to claim 1, wherein, without a heat conductive member, the first region is provided with one or more openings to discharge heat from at least the heat source.

13. The portable electronic device according to claim 12, wherein the fan is configured to send air toward the opening.

14. The portable electronic device according to claim 1, wherein in a state where the first casing is put on a flat stand and the first and the second casings are in the second state, the first region is apart from surface of the stand.

15. The portable electronic device according to claim 1, wherein the heat source is a projecting unit is configured to project an image including notification information that urges the user to carry the portable electronic device in the first state.

16. The portable electronic device according to claim 1, wherein at least a part of an operating unit is disposed in a third region which is exposed when the first casing is in the second state.

17. The portable electronic device according to claim 1, wherein the relative position is changed from the first state to the second state by moving the second casing in a longitudinal direction of the first casing, and a light emitting unit of the heat source is provided near to the first region at a front end in a movement direction of the second casing.

18. The portable electronic device according to claim 1, wherein the relative position is changed from the first state to the second state by moving the first region of the second casing in a rotational direction.

* * * * *